(12) United States Patent
Suguro et al.

(10) Patent No.: US 8,728,662 B2
(45) Date of Patent: May 20, 2014

(54) PROCESS FOR PRODUCING POLYRADICAL COMPOUND AND BATTERY CELL

(75) Inventors: Masahiro Suguro, Tokyo (JP); Shigeyuki Iwasa, Tokyo (JP); Yuki Kusachi, Tokyo (JP); Jiro Iriyama, Tokyo (JP); Yukiko Morioka, Tokyo (JP); Kentaro Nakahara, Tokyo (JP); Sadahiko Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 1498 days.

(21) Appl. No.: 12/303,592

(22) PCT Filed: Jun. 4, 2007

(86) PCT No.: PCT/JP2007/000597
§ 371 (c)(1),
(2), (4) Date: Dec. 5, 2008

(87) PCT Pub. No.: WO2007/141913
PCT Pub. Date: Dec. 13, 2007

(65) Prior Publication Data
US 2010/0255372 A1   Oct. 7, 2010

(30) Foreign Application Priority Data
Jun. 6, 2006   (JP) .................................. 2006-157681

(51) Int. Cl.
*H01M 4/13*   (2010.01)
*H01M 4/62*   (2006.01)
*C08F 26/06*   (2006.01)

(52) U.S. Cl.
USPC ............................ 429/213; 429/317; 526/265

(58) Field of Classification Search
USPC ........ 429/213, 231.95, 317; 526/263, 89, 265
See application file for complete search history.

(56) References Cited

U.S. PATENT DOCUMENTS

| 4,442,187 A | 4/1984 | MacDiarmid et al. | |
| 4,833,048 A | 5/1989 | Dejonghe et al. | |
| 4,886,716 A * | 12/1989 | Roggero et al. | 429/317 |
| 7,226,697 B2 | 6/2007 | Nakahara et al. | |
| 2008/0038636 A1* | 2/2008 | Suguro et al. | 429/213 |
| 2008/0213669 A1 | 9/2008 | Nakahara et al. | |

FOREIGN PATENT DOCUMENTS

| EP | 0312160 A2 | 10/1998 |
| EP | 1381100 A1 | 1/2004 |
| JP | 01-135856 | 5/1989 |
| JP | 05-074459 | 3/1993 |
| JP | 2002-151084 | 5/2002 |
| JP | 2002-304996 | 10/2002 |
| JP | 2002-313344 | 10/2002 |
| JP | 2002-327078 | 11/2002 |
| JP | 2003-073321 | 3/2003 |
| WO | WO 2005/078830 | 8/2005 |
| WO | WO 2005/078831 | 8/2005 |
| WO | 2005-116092 A1 | 12/2005 |
| WO | 2006/061948 | 6/2006 |

OTHER PUBLICATIONS

Okimoto, Development of a highly efficient catalyst method for synthesis of Vinyl Ethers, J. Am. Chem. Soc., vol. 124, 8, 1590-1591.*

(Continued)

*Primary Examiner* — Monique Peets
(74) *Attorney, Agent, or Firm* — Young & Thompson

(57) ABSTRACT

Disclosed is a polyradical compound which can be used as an electrode active material for at least one of a positive electrode and a negative electrode. The polyradical compound has a repeating unit represented by general formula (1) and is crosslinked using a bifunctional crosslinking agent having two polymerizing groups in the molecule represented by general formula (2), wherein $R^1$ to $R^3$ each independently represent hydrogen or methyl group; $R^4$ to $R^7$ each independently represent C1 to C3 alkyl group; X represents single bond, linear, branched or cyclic C1 to C15 alkylenedioxy group, alkylene group, phenylenedioxy group, phenylene group or structure represented by general formula (3); and $R^8$ to $R^{13}$ each independently represent hydrogen or methyl group, and k represents an integer of 2 to 5.

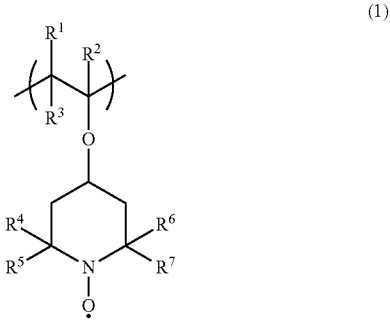

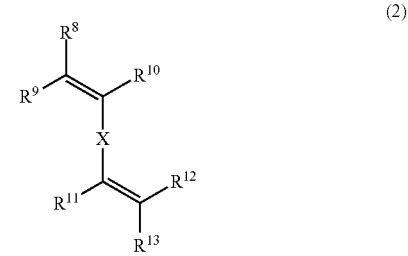

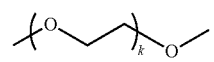

15 Claims, 1 Drawing Sheet

(56) References Cited

OTHER PUBLICATIONS

Trofimov et al., Vinyl ether of 2,2,6,6-tetramethyl-4-hydroxypiperidine-1-oxyl and its oligomers, Izvestiya Akademii Nauk SSSR, Seriya Khimicheskaya, 1986, 12, 2750-2755.*

Chinese Office Action, Application No. 200780021130.1, dated Jul. 9, 2010.

Extended European Search Report, Application No. 07737253.0, dated Jul. 27, 2010.

Y Okimoto et al., "Development of a Highly Efficient Catalytic Method for Synthesis of Vinyl Ethers", 1590 vol. 124, No. 8, 2002, J. Am. Chem. Soc.

W. Warren et al., "Homogeneous Metal Salt Catalysis in Organic Reactions I. The Preparation of Vinyl Ethers by Vinyl Transetherification", This journal, 79, 2828, 1957.

W. Reppe et al., Liebigs Ann. Chem., vol. 601, pp. 81-111 (1956).

* cited by examiner

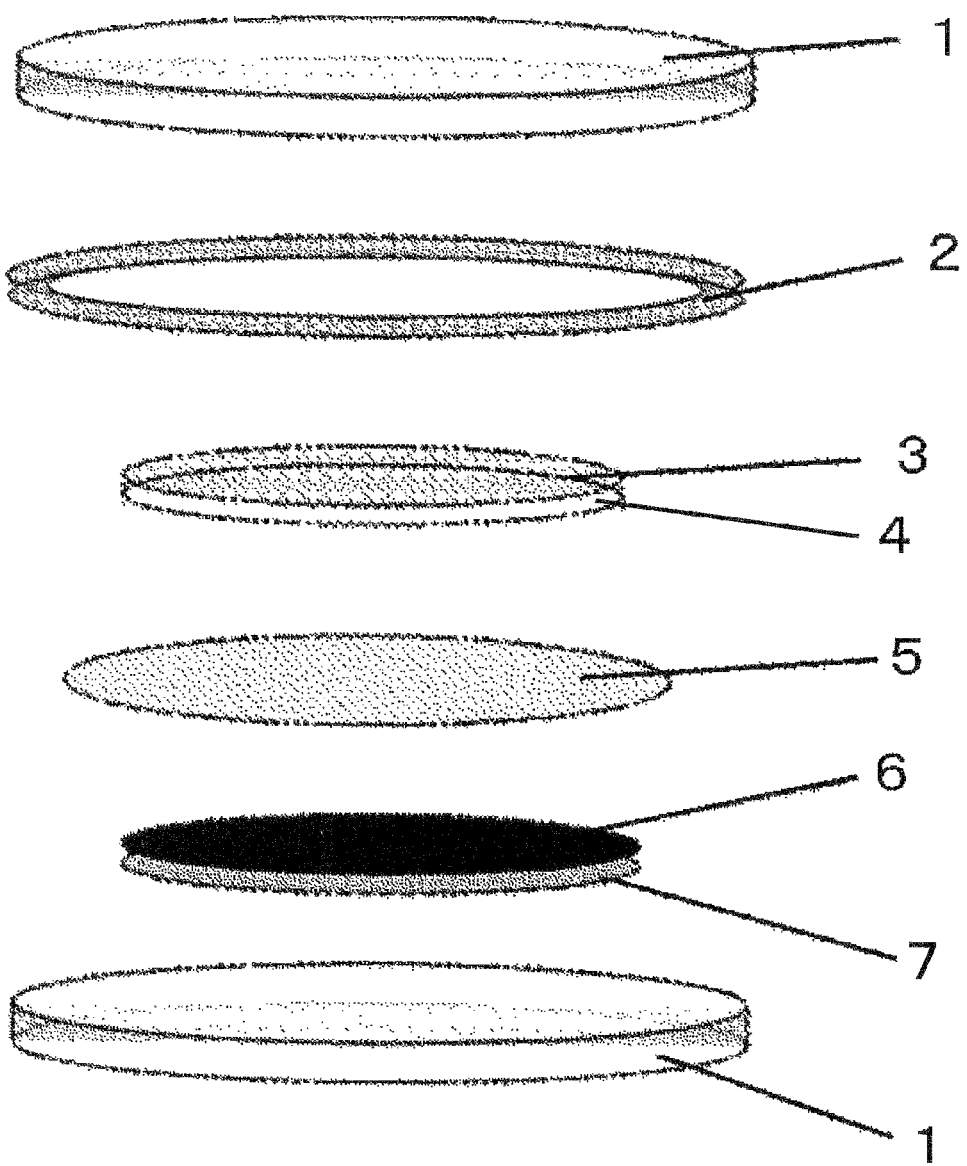

PROCESS FOR PRODUCING POLYRADICAL COMPOUND AND BATTERY CELL

TECHNICAL FIELD

The present invention relates to an electrode active material, which has higher capacitance density and allows larger quantity of electric current being extracted therefrom, and a battery cell, which exhibits higher energy density and is capable of outputting larger power, and a polyradical compound, which is capable of functioning as an electrode active material having the above-described characteristics.

BACKGROUND ART

In recent years, mobile electronic equipments such as notebook personal computer, mobile phone and the like rapidly spread along with the technical advances of the communication systems, and the performances thereof are improved year by year. In particular, power consumptions of the mobile equipments are in upward trend corresponding to enhancements of the performances. Thus, requirements such as higher energy density, higher output and the like are enhanced for battery cells that function as electric sources thereof.

Lithium ion batteries were invented for battery cell for higher energy density, and have been widely employed after 1990s. Typical lithium ion battery in this era employed electrode active materials, which were typically, for example, lithium-containing transition metal oxide such as lithium manganese oxide, lithium cobalt oxide and the like employed for a positive electrode, and carbon for a negative electrode. In such type of lithium ion battery, charging and discharging is conducted by utilizing insertion/elimination reactions of lithium ion for such electrode active material. Such lithium ion battery exhibits larger energy density and better cycle characteristics, and therefore are utilized in various types of electronic equipments such as mobile telephones and the like. However, since a rate of an electrode reaction in such lithium ion battery is lower, characteristics of battery cell are considerably deteriorated when larger electric current is extracted. Therefore, there were drawbacks of difficulty in providing larger output and requiring longer time for charging.

Electric double layer capacitors are known as capacitor devices that can provide larger output. Such electric double layer capacitor is capable of discharging larger electric current at a time, and therefore can output larger power. Further, such electric double layer capacitor exhibits better cycle characteristics, and thus further developments proceeds for backup power sources. However, such capacitor also exhibits significantly lower energy density and miniaturization thereof is difficult, and therefore is not suited for the use in power sources of mobile electronic equipments.

For the purpose of obtaining electrode material having larger energy density and smaller weight, battery cells employing sulfur compounds or organic compounds as electrode active materials has also been developed. For example, Patent Document 1 (U.S. Pat. No. 4,833,048) and Patent Document 2 (Japanese Patent No. 2,715,778) disclose battery cells employing organic compounds having disulfide bond for a positive electrode. These utilize electrochemical redox reaction involving creation and dissociation of disulfide bond as a basis for battery cells. Such battery cell is composed of electrode materials containing chemical elements of smaller specific gravities such as sulfur, carbon and the like, and thus is a high capacity battery cell having higher energy density. However, due to lower efficiency for recombination of dissociated bond and diffusion of electrode active materials into an electrolytic solution, there is a drawback of easy decrease of capacitance for a number of charging and discharging cycles.

On the other hand, battery cells employing electroconductive polymers for electrode materials are proposed as battery cells that utilize organic compounds. These are battery cells that utilize doping and de-doping reactions of electrolyte ions for the electroconductive polymers. The doping reaction is a chemical reaction, in which charged radical generated through an oxidization or a reduction of an electroconductive polymer is stabilized by counter ion. Patent Document 3 (U.S. Pat. No. 4,442,187) discloses a battery cell that utilizes such electroconductive polymer for materials of the positive electrode or the negative electrode. Such battery cell is composed of chemical element having smaller specific gravity such as carbon and nitrogen, and was expected to be employed as a high capacity battery cell. However, in the electroconductive polymer, charged radicals generated by an oxidoreduction are delocalized over wider area of π conjugated system, and these radicals typically interact to cause electrostatic restitution or dissipation of radical. This causes limitation on generation of charged radical, or in other words, to doping concentration, and thus provides limitation on the capacitance of the battery cell. For example, it is reported that doping ratio in a battery cell employing poly aniline for a positive electrode is equal to or lower than 50%, and is 7% in case of poly acethylene. In the battery cell employing the electroconductive polymer as the electrode material, while a certain advantageous effect is obtained in terms of weight reduction, no battery cell having larger energy density is obtained.

Battery cells employing an oxidation-reduction reaction of a radical compound are proposed as battery cells employing an organic compound as an electrode active material for the battery cell. For example, Patent Document 4 (Japanese Patent Laid-Open No. 2002-151,084) discloses organic radical compounds such as nitroxide radical compounds, aryloxy radical compounds and polymer compounds having certain type of amino triazine structure as active materials, and in addition, a battery cell employing an organic radical compound for a material of a positive electrode or a negative electrode is disclosed. Further, Patent Document 5 (Japanese Patent Laid-Open No. 2002-304,996) discloses capacitor devices employing nitroxide compounds, in particular compounds having cyclic nitroxide structure, as an electrode active material. In addition, polyradical compounds employed for the electrode active material therein is synthesized by polymerizing 2,2,6,6-tetramethylpiperidine methacrylate with a polymerization initiator of azobisisobutyronitrile, and then oxidizing the polymerized compound with m-chloroperbenzoic acid. On the other hand, Patent Document 6 (Japanese Patent Laid-Open No. 2002-313,344) discloses a battery cell employing nitroxyl radical polymer, which is a polyradical compound, as a binder for electrodes.

On the other hand, processes for synthesizing vinyl ethers such as vinyl ether, divinyl ether, trivinyl ether and the like are known, which typically comprise a process for reacting acetylene and associated alcohol under a pressure (about 20-50 atom) in the presence of potassium hydroxide and sodium hydroxide at catalyst quantities at higher temperature (180 to 200 degree C.) (Non-Patent Document 1); a process for thermally refluxing associated alcohol and alkyl vinyl ether in the presence of mercuric acetate catalyst (Non-Patent Document 2); and a process for thermally refluxing associated alcohol and vinyl acetate in the presence of iridium catalyst (Non-Patent Document 3 and Patent Document 7).
[Patent Document 1]
U.S. Pat. No. 4,833,048
[Patent Document 2]
Japanese Patent No. 2,715,778
[Patent Document 3]
U.S. Pat. No. 4,442,187
[Patent Document 4]
Japanese Patent Laid-Open No. 2002-151,084
[Patent Document 5]
Japanese Patent Laid-Open No. 2002-304,996
[Patent Document 6]
Japanese Patent Laid-Open No. 2002-313,344
[Patent Document 7]
Japanese Patent Laid-Open No. 2003-73,321
[Non-Patent Document 1]
Reppe, W., et al., Liebigs Ann. Chem., volume 601, pp. 81-111 (1956)
[Non-Patent Document 2]
Warren, H., Journal of The American Chemical Society, volume 79, pp. 2828-2833 (1957)
[Non-Patent Document 3]
Ishii, Y, Journal of The American Chemical Society, volume 124, pp. 1590-1591 (2002)

DISCLOSURE OF THE INVENTION

As described above, a manufacture of a battery cell, which exhibits higher energy density per weight and is capable of outputting larger power, is difficult when the lithium ion battery employing transition metal oxide for positive electrode is adopted. On the other hand, while the electric double layer capacitor exhibits larger output, energy density per weight thereof is lower, and thus it is difficult to provide higher capacity. In addition, in the case of the battery cell that utilizes sulfur compounds or electroconductive organic compounds for the electrode active material, a battery cell exhibiting higher energy density has not yet been obtained. Further, in the case of the battery cell that utilizes an oxidation-reduction reaction of an organic radical compound, cracks are generated in the electrode due to the process for manufacturing the battery cell, and thus this cause a problem of a difficulty in the manufacturing. Therefore, novel and simpler process for manufacturing electrodes and new material that achieves more simple process are expected. Further, a material exhibiting larger energy density is also expected.

The present invention provides an electrode active material, which has higher capacitance density and allows larger quantity of electric current being extracted therefrom, and a battery cell, which exhibits higher energy density and is capable of outputting larger power. The present invention also provides a polyradical compound, which is capable of functioning as an electrode active material, and a process for producing thereof.

Results of studies of the present inventors show that the above-described problems can be solved by utilizing a specified organic compound that has not been utilized as an electrode active material as an electrode active material, namely a polyradical compound, which has a fraction structure represented by general formula (1) in its molecule and is cross-linked by a bifunctionalized crosslinking agent having two polymerizing groups in its molecule represented by general formula (2). More specifically, according to the present invention, a novel battery cell exhibiting higher energy density and being capable of outputting larger power (more specifically, capable of discharging larger electric current) can be provided by employing a polyradical compound as an electrode active material, which has a fraction structure represented by general formula (1) in its molecule and is cross-linked by a bifunctionalized crosslinking agent having two polymerizing groups in its molecule represented by general formula (2), and utilizing an oxidation-reduction of such fractions.

According to one aspect of the present invention, there is provided an electrode active material containing a polyradical compound, which has a fraction structure represented by general formula (1) in its molecule and is cross-linked by a bifunctionalized crosslinking agent having two polymerizing groups in its molecule represented by general formula (2):

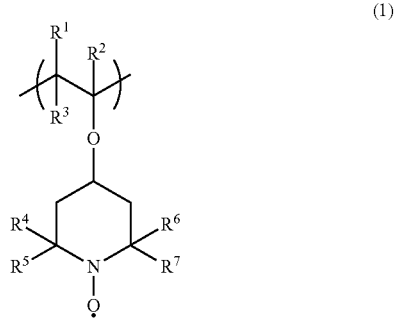

(1)

wherein in general formula (1), $R^1$ to $R^3$ each independently represent hydrogen or methyl group; and $R^4$ to $R^7$ each independently represent C1 to C3 alkyl group;

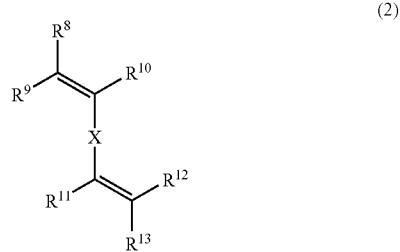

(2)

wherein in general formula (2), X represents single bond, linear, branched or cyclic C1 to C15 alkylenedioxy group, alkylene group, phenylenedioxy group, phenylene group or structure represented by general formula (3); and $R^8$ to $R^{13}$ each independently represent hydrogen or methyl group;

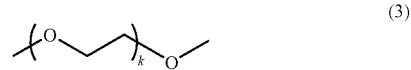

(3)

wherein in general formula (3), k represents an integer of 2 to 5.

In the battery cell of the present invention, the polyradical compound, which has a fraction structure represented by general formula (1) in its molecule, involves oxidation-reduction reaction through the following scheme (I) or scheme (II) in a process for charging and discharging. When the polyradical compound having the fraction structure represented by general formula (1) is employed for the positive electrode in the oxidation-reduction reaction of scheme (I), the charging causes a change of the state from (A) to (B), releasing electron. The discharging causes a change of the state from (B) to (A), accepting electron. On the other hand, when a polymer is employed for a positive electrode n the oxidation-reduction reaction of scheme (II), the charging causes a change of the state from (C) to (A), releasing electron. The discharging causes a change of the state from (A) to (C), accepting electron. In terms of stability in oxidation-reduction reactions of polymers, it is preferable to employ the oxidation-reduction of scheme (I) to achieve the charging and discharging.

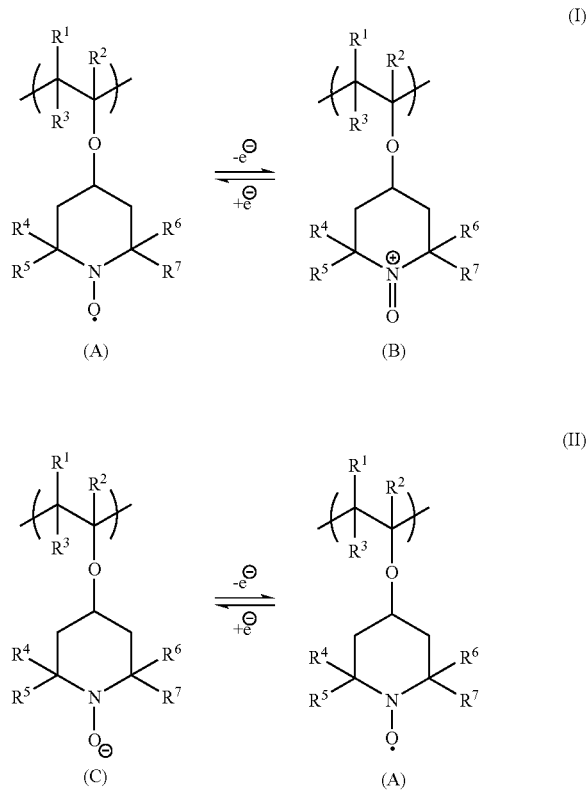

Since the electrode active material is or oxidized or reduced in the battery cell by the charging and discharging, the electrode active material is in either of a departure condition and an oxidation state. In the present invention, the aforementioned electrode active material has the fraction structure represented by general formula (1) in a state of either of charged or discharged.

The present invention is made on the basis of the discovery that the polyradical compound, which has a fraction structure represented by general formula (1) in its molecule and is cross-linked by a bifunctionalized crosslinking agent having two polymerizing groups in its molecule represented by general formula (2), serves better electrode active material. This is, more specifically, based on the fact that the polyradical compound, which has a fraction structure represented by general formula (1) in its molecule and is cross-linked by a bifunctionalized crosslinking agent having two polymerizing groups in its molecule represented by general formula (2), causes substantially no side reaction but causes a reversible and stable oxidation-reduction reaction at a reaction rate of substantially 100%. That is, a battery cell employing, as an electrode active material, the polyradical compound, which has a fraction structure represented by general formula (1) in its molecule and is cross-linked by a bifunctionalized crosslinking agent having two polymerizing groups in its molecule represented by general formula (2), exhibits stable charging and discharging and is a battery cell having better cycle characteristic. Further, a battery cell employing, as an electrode active material, the polyradical compound, which has a fraction structure represented by general formula (1) in its molecule and is cross-linked by a bifunctionalized crosslinking agent having two polymerizing groups in its molecule represented by general formula (2), also exhibits better output characteristic, as compared with the conventional lithium ion battery and the like. This is because substitutional groups in the molecule of the polyradical compound, which has a fraction structure represented by general formula (1) in its molecule and is cross-linked by a bifunctionalized crosslinking agent having two polymerizing groups in its molecule represented by general formula (2), exhibits larger electrode reaction rate, thereby discharging larger amount of electric current at a time. Further, the polyradical compound, which has a fraction structure represented by general formula (1) in its molecule and is cross-linked by a bifunctionalized crosslinking agent having two polymerizing groups in its molecule represented by general formula (2), may be composed of only chemical elements having smaller mass such as carbon, nitrogen, hydrogen, oxygen and the like. Consequently, mass of the electrode active material can be reduced, and the capacitance density per unit mass of the electrode manufactured by employing such material is increased, and as a result, when a battery cell is manufactured employing such electrode active material, the manufactured battery cell exhibits larger energy density per mass.

Further, it may be sufficient in the present invention that the polyradical compound, which has a fraction structure represented by general formula (1) in its molecule and is cross-linked by a bifunctionalized crosslinking agent having two polymerizing groups in its molecule represented by general formula (2), directly contributes the electrode reaction at the positive electrode or the negative electrode, and the electrode employed as the electrode active material material is not particularly limited to be used for either the positive electrode or the negative electrode. However, in view of the energy density, the polyradical compound, which has a fraction structure represented by general formula (1) in its molecule and is cross-linked by a bifunctionalized crosslinking agent having two polymerizing groups in its molecule represented by general formula (2) may be particularly preferably employed as the electrode active material of the positive electrode. Further, in view of obtaining higher voltage and/or larger capacitance, the battery cell of the present invention may preferably be a lithium battery cell, in particular a lithium secondary cell, which employs metallic lithium or carbon, in which lithium ion is inserted or detached, for the negative electrode.

In addition to above, the polyradical compound employed as the electrode active material in the present invention may be preferably produced by the following process. More specifically, the present invention is directed to a process for producing a polyradical compound, wherein the process comprises crosslinking a radical-substituted vinyl ether compound represented by the following general formula (11) with a difunctionalized crosslinking agent having two polymerization group in molecule represented by general formula (2) in the presence of cationic polymerization catalyst to obtain polyradical compound:

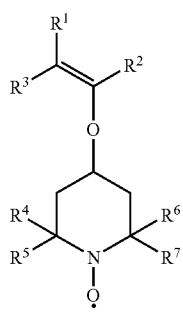

(11)

wherein in general formula (11), $R^1$ to $R^3$ each independently represent hydrogen or methyl group; and $R^4$ to $R^7$ each independently represent C1 to C3 alkyl group;

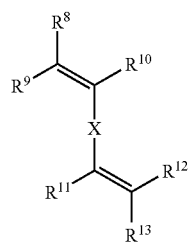

(2)

wherein in general formula (2), X represents single bond, linear, branched or cyclic C1 to C15 alkylenedioxy group, alkylene group, phenylenedioxy group, phenylene group or structure represented by general formula (3); and $R^8$ to $R^{13}$ each independently represent hydrogen or methyl group;

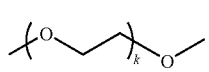

(3)

wherein in general formula (3), k represents an integer of 2 to 5.

The present invention proposes an electrode active material containing a polyradical compound, which has a fraction structure represented by general formula (1) in its molecule and is cross-linked by a bifunctionalized crosslinking agent having two polymerizing groups in its molecule represented by general formula (2), and a novel battery cell employing such electrode active material. This allows providing an electrode active material, which has higher capacitance density and allows larger quantity of electric current being extracted therefrom, and a battery cell, which exhibits higher energy density and is capable of outputting larger power. Therefore, according to the present invention, a manufacture of a battery cell containing no heavy metal as an electrode active material and composed of light and safe chemical elements can be achieved. A battery cell, which exhibits higher capacity (per mass) and better stability in the charging and discharging cycle and further is capable of outputting larger power, can also be achieved. A process for manufacturing the above-described polyradical compound can also be provided.

BRIEF DESCRIPTION OF THE DRAWINGS

The above and other objects, advantages and features of the present invention will be more apparent from the following description of certain preferred embodiments taken in conjunction with the annexed drawings.

FIG. 1 is a schematic diagram illustrating an example of a configuration of a battery cell of the present invention.

BEST MODE FOR CARRYING OUT THE INVENTION

A configuration of an embodiment of a battery cell of the present invention is shown in FIG. 1. The battery cell shown in FIG. 1 includes a positive electrode 6 arranged on one side of a cathode current collector 7, a negative electrode 4 arranged on one side of an anode current collector 3, a separator 5 containing an electrolyte, an insulating packing 2 and a stainless steel sheath 1. In the battery cell shown in FIG. 1, the positive electrode 6 and the negative electrode 4 are stacked so as to be opposed across the separator 5. These are covered by the stainless steel sheath 1 in the side of the negative electrode and the stainless steel sheath 1 in the side of the positive electrode, between which is provided with an insulating packing 2 composed of an insulating material such as a plastic resin and the like for the purpose of preventing an electrical contact of the both thereof. In addition to above, when a solid electrolyte or a gel electrolyte is employed as an electrolyte, such electrolyte may be disposed between the electrodes in place of the separator 5.

In the present invention, in such configuration, it is characterized in that the electrode active material employed in one of or both of the negative electrode 4 and the positive electrode 6 contains the polyradical compound, which has a fraction structure represented by the above-described general formula (1) in its molecule and is cross-linked by a bifunctionalized crosslinking agent having two polymerizing groups in its molecule represented by general formula (2).

The battery cell of the present invention may preferably be a lithium battery cell, in particular a lithium secondary cell, which employs the above-described electrode active material as the positive-electrode active material, in view of the capacitance of the battery cell.

[1] Electrode Active Material

The electrode active material in the electrode in the present invention is a material that directly contributes to the electrode reaction such as the charging reaction and the discharge reaction, and plays a major role in the battery cell system.

In the present invention, an electrode active material containing the polyradical compound, which has a fraction structure represented by general formula (1) in its molecule and is cross-linked by a bifunctionalized crosslinking agent having two polymerizing groups in its molecule represented by general formula (2), is employed as an electrode active material.

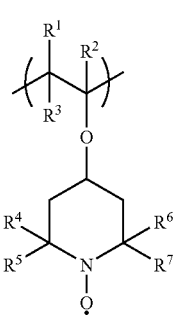

(1)

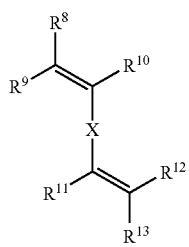
(2)

In general formula (1), $R^1$ to $R^3$ each independently represent hydrogen or methyl group; $R^4$ to $R^7$ each independently represent C1 to C3 alkyl group. In general formula (2), X represents single bond, linear, branched or cyclic C1 to C15 alkylenedioxy group, alkylene group, phenylenedioxy group, phenylene group or structure represented by general formula (3). $R^8$ to $R^{13}$ each independently represent hydrogen or methyl group.

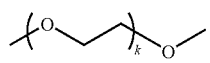
(3)

In general formula (3), k represents an integer of 2 to 5.

X in the above-described formula (2) typically includes, for example, cyclohexylene dihydroxy group, di(ethylenedioxy) group and tri(ethylenedioxy) group.

In the battery cell of the present invention, the electrode active material is desirably in a state to be fixed to the electrode. However, in such case, for inhibiting a decrease in the capacitance due to a dissolution of the electrode active material into the electrolytic solution, the electrode active material in the solid state may be preferably insoluble or poorly soluble for the electrolytic solution. In such status, this may be swelled if this is insoluble for the electrolytic solution.

This is because, when the solubility to the electrolytic solution is higher, the electrode active material from the electrode is dissolved into the electrolytic solution to cause a possibility to decrease the capacitance during the charging and discharging cycle.

Consequently, it is preferable that the polyradical compound, which has a fraction structure represented by general formula (1) in its molecule and is cross-linked by a bifunctionalized crosslinking agent having two polymerizing groups in its molecule represented by general formula (2), is insoluble into an organic solvent.

Typical examples of the polyradical compound, which has a fraction structure represented by general formula (1) in its molecule and is cross-linked by a bifunctionalized crosslinking agent having two polymerizing groups in its molecule represented by general formula (2), include polyradical compounds having fraction structures represented by the following formulae 12 to 31. Here, the fraction structure represented by general formula (1) and the fraction structure derived from the crosslinking agent represented by general formula (2) are co-polymerized at random.

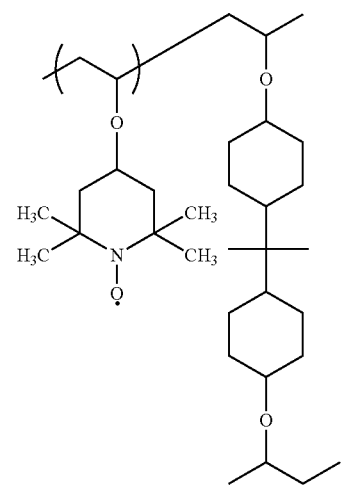
(12)

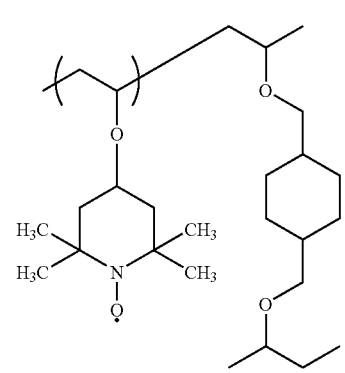
(13)

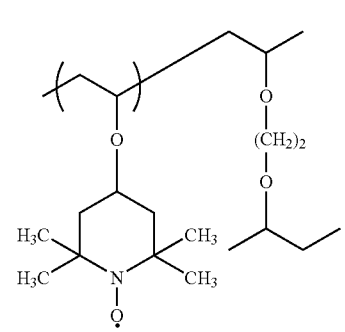
(14)

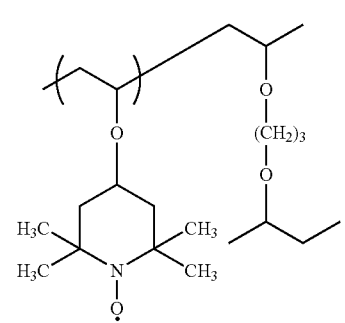
(15)

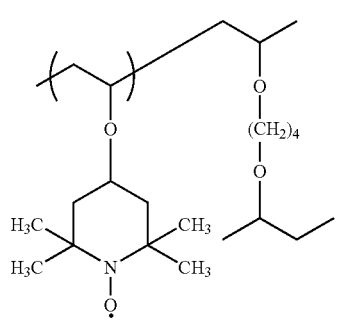 (16)
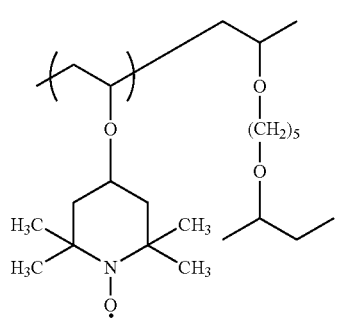 (17)
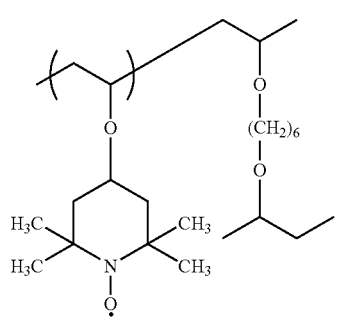 (18)
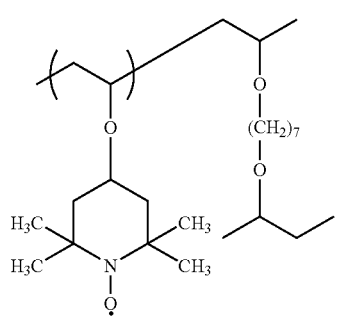 (19)
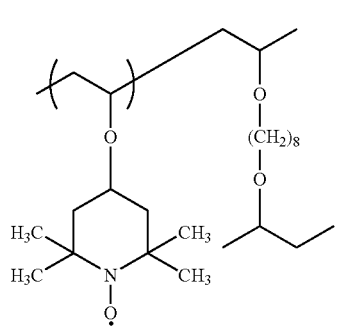 (20)
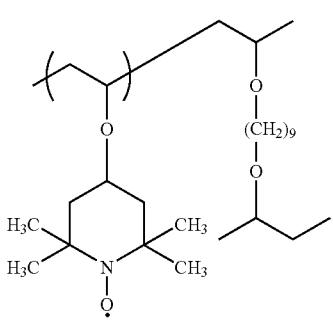 (21)
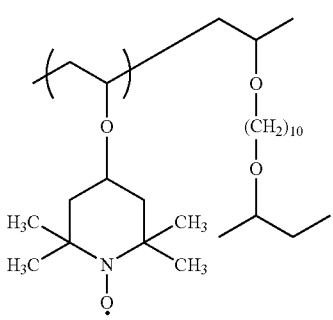 (22)
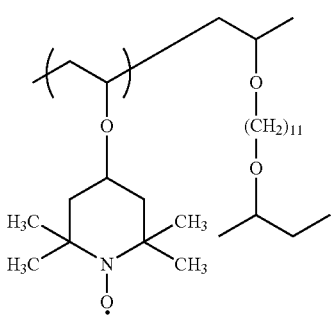 (23)
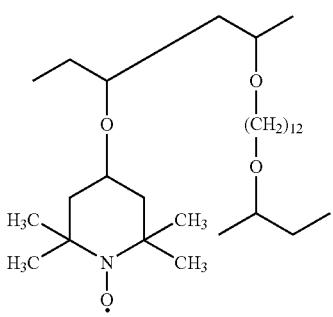 (24)
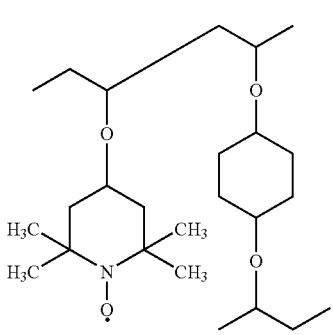 (25)

(26)
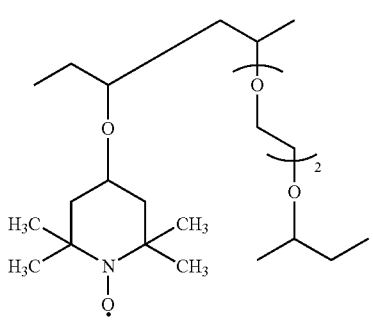

(27)
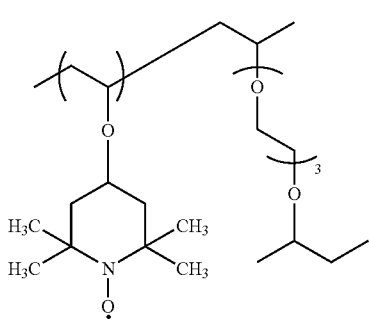

(28)
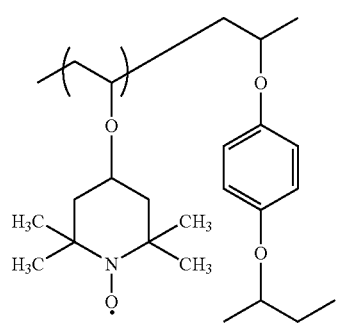

(29)
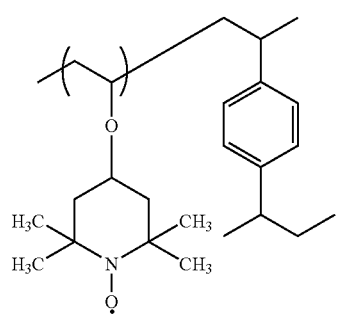

(30)
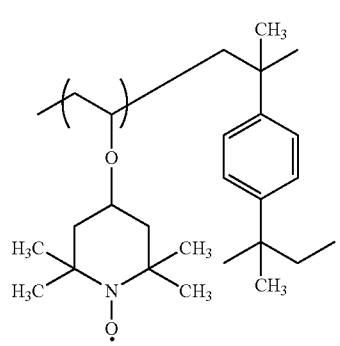

(31)
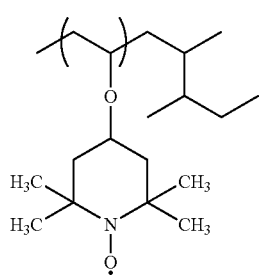

The polyradical compound, which has a fraction structure represented by general formula (1) in its molecule and is cross-linked by a bifunctionalized crosslinking agent having two polymerizing groups in its molecule represented by general formula (2), may be synthesized through, for example, a route illustrated in the following synthesis scheme (III). More specifically, in the presence of a cationic polymerization catalyst and the difunctionalized crosslinking agent having two polymerization groups in its molecule, polymerization of a radical-substituted vinyl ether compound may be conducted through cationic polymerization process. For example, boron trifluoride diethylether complex may be, for example, employed for the cationic polymerization catalyst and a compound of general formula (2) (for example, 1,4-butanediol divinyl ether) may be employed for the crosslinking agent to conduct a polymerization of A compound of formula (11) (for example, 2,2,6,6-tetramethylpiperidine-4-vinyloxy-1-oxyl), so that a polyradical compound (32) is synthesized. In addition, the compounds represented by the above-described formulae 12 to 31 may be synthesized through similar processes.

(III)

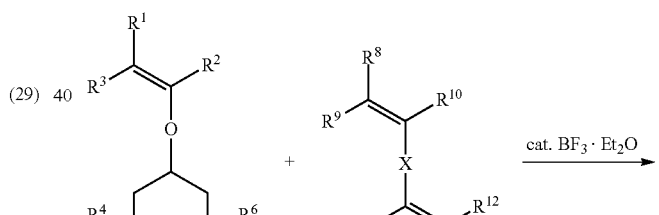

(11)  (2)

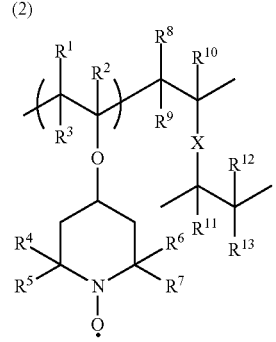

(32)

In general formula (1), $R^1$ to $R^3$ each independently represent hydrogen or methyl group; and $R^4$ to $R^7$ each independently represent C1 to C3 alkyl group.

In general formula (2), X represents single bond, linear, branched or cyclic C1 to C15 alkylenedioxy group, alkylene group, phenylenedioxy group, phenylene group or structure represented by general formula (3); and $R^8$ to $R^{13}$ each independently represent hydrogen or methyl group.

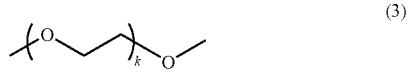

(3)

In general formula (3), k represents an integer of 2 to 5.

In addition, catalysts that are available in general cationic polymerizations may be employed for the cationic polymerization catalyst employed in the polymerization in addition to the above-described catalyst, and a Lewis acid may be preferably employed. While proton acid may also be employed for the cationic polymerization catalyst, a condition for causing no side reaction with monomer having radical is preferably employed in such case. Available Lewis acid includes aluminum chloride, tin tetrachloride, ferric-chloride and the like. In addition, a catalyst of a combination of a transition metal compound such as tin tetrachloride, titanium tetrachloride, titanium trichloride, vanadium tetrachloride, vanadium oxytrichloride and the like and an organometallic compound with a typical metal such as triethylaluminium, ethylaluminum dichloride, triethyl oxonium hexafluoro borate and the like may also be employed. In such case, the synthesis scheme, the employed source material, the reaction conditions or the like may be suitably modified and a known synthesis technology may be suitably combined to synthesize a target polyradical compound. Such polymerization process may be preferably conducted within an organic solvent. Further, in view of providing better solubility of monomer, it is more preferable to conduct within a halogen based organic solvent. Dichloromethane or chloroform may be preferably employed for the halogen based organic solvents.

The crosslinking agents employed for crosslinking process may include a difunctionalized crosslinking agent having two polymerization groups in its molecule, which is employed as a general crosslinking agent for poly(vinyl ether), in addition to the above-described agents. Typical difunctionalized crosslinking agents include 1,3-propanediol divinyl ether, 1,4-butanediol divinyl ether, 1,5-pentane diol divinyl ether, 1,6-hexane diol divinyl ether, 1,7-heptane diol divinyl ether, 1,8-octanediol divinyl ether, 1,9-nonane diol divinyl ether, 1,10-decane diol divinyl ether, 1,11-undecane diol divinyl ether, 1,12-dodecane diol divinyl ether, cyclohexane diol divinyl ether, cyclohexane di methanol divinyl ether, ethylene glycol divinyl ether, diethylene glycol divinyl ether, triethylene glycol divinyl ether, trimethyl propane tri vinyl ether, divinylbenzene, divinyloxybenzene, di (f∠-methylvinyl) benzene, butadiene, isobutene, alicyclic divinyl ether and the like.

In addition to above, vinyl ether monomer employed for the synthesis of the above-described polyradical compound and the bifunctionalized crosslinking agent having two polymerizing groups in its molecule may be synthesized by employing the following process. For example, as described in Reppe, W., et al., Liebigs Ann. Chem., volume 601, pp. 81-111 (1956), such synthesis is achieved by reacting acetylene and associated alcohol under a pressure (about 20-50 atom) in the presence of potassium hydroxide and sodium hydroxide at catalyst quantities at a higher temperature (180 to 200 degree C.). Alternatively, as described in Warren, H., Journal of The American Chemical Society, volume 79, pp. 2828-2833 (1957), such synthesis is also achieved by thermally refluxing associated alcohol and alkyl vinyl ether in the presence of mercuric acetate catalyst. Further, as described in Ishii, Y., Journal of The American Chemical Society, volume 124, pp. 1590-1591 (2002) and Japanese Patent Laid-Open No. 2003-73,321, such synthesis is also achieved by thermally refluxing associated alcohol and vinyl acetate in the presence of iridium catalyst.

Alternatively, in the electrode active material in one electrode of the battery cell of the present invention, the polyradical compound, which has a fraction structure represented by general formula (1) in its molecule and is cross-linked by a bifunctionalized crosslinking agent having two polymerizing groups in its molecule represented by general formula (2), may be employed alone, or a combination of two or more thereof may alternatively be employed. Alternatively, a combination thereof with other electrode active materials may also be employed. In such case, in the electrode active material, the polyradical compound, which has a fraction structure represented by general formula (1) in its molecule and is cross-linked by a bifunctionalized crosslinking agent having two polymerizing groups in its molecule represented by general formula (2), may be preferably contained at 10 to 90% by mass, and may be more preferably contained at 20 to 80% by mass.

When the polyradical compound, which has a fraction structure represented by general formula (1) in its molecule and is cross-linked by a bifunctionalized crosslinking agent having two polymerizing groups in its molecule represented by general formula (2), is employed for the positive electrode, other electrode active materials such as metal oxides, disulphide compounds, other stable radical compounds, electroconductive polymers and the like may be additionally employed. Here, typical metal oxides include, for example: lithium manganese oxide or lithium manganese oxide having spinel structure such as $LiMnO_2$, $Li_xMn_2O_4$ (0<x<2) and the like; $MnO_2$, $LiCoO_2$, $LiNiO_2$, or $Li_yV_2O_5$ (0<y<2); olivine structure materials such as $LiFePO_4$; materials, in which Mn in spinel structure is partially substituted with other transition metals such as $LiNi_{0.5}Mn_{1.5}O_4$, $LiCr_{0.5}Mn_{1.5}O_4$, $LiCo_{0.5}Mn_{1.5}O_4$, $LiCoMnO_4$, $LiNi_{0.5}Mn_{0.5}O_2$, $LiNi_{0.33}Mn_{0.33}Co_{0.33}O_2$, $LiNi_{0.8}Co_{0.2}O_2$, $LiN_{0.5}Mn_{1.5-z}Ti_zO_4$ (0<z<1.5) and the like. Typical disulphide compounds includes dithio glycol; 2,5-dimercapto-1,3,4-thiadiazole; S-triazine-2,4,6-trithiol and the like. Other stable radical compounds typically include poly(2,2,6,6-tetramethyl piperidinoxyl-4-yl methacrylate) and the like. Further, typical electroconductive polymers include polyacethylene; polyphenylene; polyaniline; polypyrrole and the like. Among these, a combination thereof with lithium manganese oxide or $LiCoO_2$ may be particularly preferable. In the present invention, such other electrode active materials may be employed alone, or a combination of two or more thereof may alternatively be employed.

When the polyradical compound, which has a fraction structure represented by general formula (1) in its molecule and is cross-linked by a bifunctionalized crosslinking agent having two polymerizing groups in its molecule represented by general formula (2), is employed for the negative electrode, other electrode active materials such as graphite and amorphous carbon, metallic lithium and lithium alloy, lithium ion occluded carbon, metallic sodium, electroconductive polymers and the like may be additionally employed. Alternatively, a combination thereof with other stable radical compounds may also be employed. Other stable radical compounds typically include poly(2,2,6,6-tetramethyl piperidinoxyl-4-yl methacrylate) and the like. Forms of these materials are not particularly limited to any specific form, and for example, concerning metallic lithium, the form is not limited to thin film, but may be bulk, caked powder, fiber, flake and the like. Among these, a combination thereof with metallic lithium or graphite may be particularly preferable. Further, such other electrode active materials may be employed alone, or a combination of two or more thereof may alternatively be employed.

While the polyradical compound, which has a fraction structure represented by general formula (1) in its molecule and is cross-linked by a bifunctionalized crosslinking agent having two polymerizing groups in its molecule represented by general formula (2) is employed as the electrode active material for the electrode reaction in one of, or for the electrode reactions in both of, the positive electrode and the negative electrode in the battery cell of the present invention, conventionally known electrode active materials as illustrated above may additionally be utilized for the electrode active material in the other electrode when it is employed for the electrode active material in the electrode reaction at one electrode. These electrode active materials may be employed alone, or a combination of two or more thereof may alternatively be employed, and a combination of at least one of these electrode active materials and the polyradical compound, which has a fraction structure represented by general formula (1) in its molecule and is cross-linked by a bifunctionalized crosslinking agent having two polymerizing groups in its molecule represented by general formula (2), may also be employed. Alternatively, the polyradical compound, which has a fraction structure represented by general formula (1) in its molecule and is cross-linked by a bifunctionalized crosslinking agent having two polymerizing groups in its molecule represented by general formula (2), may be employed alone.

It may be sufficient in the present invention that the polyradical compound, which has a fraction structure represented by general formula (1) in its molecule and is cross-linked by a bifunctionalized crosslinking agent having two polymerizing groups in its molecule represented by general formula (2), directly contributes the electrode reaction at the positive electrode or the negative electrode, and the electrode employed as the electrode active material material is not particularly limited to be used for either the positive electrode or the negative electrode. However, in view of the energy density, the polyradical compound, which has a fraction structure represented by general formula (1) in its molecule and is cross-linked by a bifunctionalized crosslinking agent having two polymerizing groups in its molecule represented by general formula (2) may be particularly preferably employed as the electrode active material of the positive electrode. In such case, the polyradical compound, which has a fraction structure represented by general formula (1) in its molecule and is cross-linked by a bifunctionalized crosslinking agent having two polymerizing groups in its molecule represented by general formula (2), may be preferably to employed alone for the positive-electrode active material. However, these may alternatively be employed in combination with other positive-electrode active materials, and other positive-electrode active materials in such case may be preferably lithium manganese oxide or $LiCoO_2$. Further, when the above-described positive-electrode active material is employed, metallic lithium or graphite may be preferably employed for the anode active material.

[2] Electrical Conduction Agent (Electrical Conduction Aid Material) and Ionic Conduction Aid Material When the electrode is formed by employing the aforementioned polyradical compound, which has a fraction structure represented by general formula (1) in its molecule and is cross-linked by a bifunctionalized crosslinking agent having two polymerizing groups in its molecule represented by general formula (2), an electrical conduction agent (electrical conduction aid material) or an ionic conduction aid material may be mixed therein, for the purpose of providing a reduced impedance and an enhanced energy density and output characteristic. Concerning these materials, typical electrical conduction aid materials include carbonaceous fine particles such as graphite, carbon black, acetylene black and the like; carbon fibers such as vapor grown carbon fiber (VGCF), carbon nano tube and the like; electroconductive polymers such as polyaniline, poly pyrrole, polythiophene, polyacethylene, polyacene and the like, and typical ionic conduction aid materials include polymer gel electrolytes, polymer solid electrolyte and the like. Among these, a mixture thereof with carbon fiber may be preferable. The mixture with carbon fiber provides further enhanced tensile strength of the electrode, achieving a reduced cracking or flaked off of the electrode. More preferably, a mixture with the vapor grown carbon fiber may be more preferable. One of these materials may be employed alone, or a combination of two or more thereof may alternatively be employed. Preferable ratio of these materials in the electrode may be 10 to 80% by mass.

[3] Binder

In order to strengthen the adhesion between respective configuration members of the electrode, a binder may additionally be employed. Such binders typically include resin binders such as polytetrafluoroethylene, polyvinylidene fluoride, vinylidene fluoride-hexafluoropropylene copolymer, vinylidene fluoride-tetrafluoroethylene copolymer, styrene butadiene copolymer rubber, polypropylene, polyethylen, polyimide, various types of polyurethanes and the like. One of these resin binders may be employed alone, or a combination of two or more thereof may alternatively be employed. Preferable ratio of the binder in the electrode may be 5 to 30% by mass.

[4] Thickening Agent

A thickening agent may be additionally employed for helping a manufacture of an electrode slurry. Such thickening agents typically include carboxymethyl cellulose, polyoxyethylene, polypropylene oxide, hydroxyethyl cellulose, hydroxypropylcellulose, carboxymethyl hydroxyethyl cellulose, polyvinyl alcohol, polyacrylamide, poly hydroxyethyl acrylate, poly ammonium acrylate poly sodium acrylate and the like. One of these thickening agents may be employed alone, or a combination of two or more thereof may alternatively be employed. Preferable ratio of the thickening agent in the electrode may be 0.1 to 5% by mass.

[5] Catalyst

A catalyst that assists an oxidation-reduction reaction may additionally be employed for conducting smoother electrode reaction. Such catalysts typically include electroconductive polymers such as polyaniline, poly pyrrole, polythiophene, polyacethylene, polyacene and the like; basic compounds such as pyridines, pyrrolidones, benzimidazole derivative, benzothiazoles, acridines and the like; metal ion complexes and the like. One of these catalysts may be employed alone, or a combination of two or more thereof may alternatively be employed. Preferable ratio of the binder in the electrode may be not higher than 10% by mass.

[6] Current Collector and Separator

A foil of nickel, aluminum, copper, gold, silver, aluminum alloy, stainless steel, carbon and the like having a plane shape or a mesh shape may be available for the anode current collector and the cathode current collector. Alternatively, catalyst effect is additionally provided to the current collector, or the electrode active material may be chemically bonded to the current collector.

On the other hand, a separator composed of a porous film such as polyethylene, polypropylene and the like or a nonwoven fabric may also be employed for avoiding a contact of the above-described positive electrode with the negative electrode.

[7] Electrolyte

In the present invention, an electrolyte serves as transferring charged carrier between the negative electrode and the positive electrode, and in general, the electrolyte preferably exhibits an ionic conductivity within a range of from $10^{-5}$ to $10^{-1}$ S/cm at 20 degree C. Available electrolytes typically include, for example, an electrolytic solution containing an electrolytic salt dissolved in a solvent. Conventionally known materials such as for example, $LiPF_6$, $LiClO_4$, $LiBF_4$, $LiCF_2SO_3$, $Li(CF_3SO_2)_2N$, $Li(C_2F_5SO_2)_2N$, $Li(CF_3SO_2)_3C$, $Li (C_2F_5SO_2)_3C$ and the like may be employed for the electrolyte salt. One of these electrolyte salts may be employed alone, or a combination of two or more thereof may alternatively be employed.

In addition, when a solvent is employed for the electrolytic solution, organic solvents such as, for example, ethylene carbonate, Propylene carbonate, dimethyl carbonate, diethyl carbonate, methylethyl carbonate, fA-butyrolactone, tetrahydrofuran, dioxolane, sulfolane, N,N-dimethylformamide, N,N-dimethylacetamide, N-methyl-2-pyrrolidone and the like may be employed for the solvent. One of these solvents may be employed alone, or a combination of two or more thereof may alternatively be employed.

Further, in the present invention, solid electrolytes may be employed for the electrolyte. Polymer compounds employed for these solid electrolytes typically include vinylidene fluoride based polymers such as polyvinylidene fluoride, vinylidene fluoride-hexafluoropropylene copolymer, vinylidene fluoride-ethylene copolymer, vinylidene fluoride-monofluoro ethylene copolymer, vinylidene fluoride-trifluoro ethylene copolymer, vinylidene fluoride-tetrafluoroethylene copolymer, vinylidene fluoride-hexafluoropropylene-tetrafluoroethylene terpolymer and the like; acrylonitrile based polymers such as acrylonitrile-methyl methacrylate copolymer, acrylonitrile-methylacrylate copolymer, acrylonitrile-ethyl methacrylate copolymer, acrylonitrile-ethylacrylate copolymer, acrylonitrile-methacrylic acid copolymer, acrylonitrile-acrylic acid copolymer, acrylonitrile-vinyl acetate copolymer and the like; and polymers such as polyethylene oxide, ethylene oxide-propylene oxide copolymer, acrylate thereof or methacrylate thereof and the like.

A gelated material of these polymer compounds containing an electrolytic solution may be employed, or the polymer compounds containing an electrolyte salt may be employed as it is.

[8] Geometry of Battery Cell

In the present invention, geometry of a battery cell is not particularly limited to any specific geometry, and conventionally known geometry may be employed. Typical battery cell geometry includes an electrode multiple-layered member or a rolled member, which is encapsulated with a metal case, a resin case, or laminated films composed of a metallic foil such as an aluminum foil and the like and a synthetic resin film, and the battery cell is formed to be cylindrical, square, coin-like or sheet, though the present invention is not limited thereto.

[9] Process for Manufacturing Battery Cell

A process for manufacturing the battery cell is not particularly limited to any specific process, and a suitably selected process for the material may be employed. For example, typical process may be a process, in which a solvent is added to an electrode active material, an electrical conduction agent and the like to form a slurry, and the slurry is then applied over the electrode current collector, and then the solvent is volatilized via a heating or at an ambient temperature to manufacture the electrodes, and further, such electrodes are disposed to be opposed, or stacked with a separator interleaved therebetween or rolled, and wrapped with a sheath member, and then an electrolytic solution is injected therein and then is encapsulated. Solvents available for forming a slurry typically include ether based solvent such as tetrahydrofuran, diethyl ether, ethylene glycol dimethylether, dioxane and the like; amine-based solvents such as N,N-dimethylformamide, N-methylpyrrolidone and the like; aromatic hydrocarbon based solvents such as benzene, toluene, xylene and the like; aliphatic hydrocarbon based solvents such as hexane, heptane and the like; halogenated hydrocarbon based solvents such as chloroform, dichloromethane, dichloroethane, trichloroethane, tetrachloromethane and the like; alkylketone based solvents such as acetone, methyl ethyl ketone and the like; alcohol based solvents such as methanol, ethanol, isopropanol and the like; dimethylsulfoxide; water; and the like. In addition, typical process for manufacturing the electrode includes kneading an electrode active material, an electrical conduction agents and the like in dry condition, then forming a thin film of the knead compound, and then depositing the compound on the electrode current collector. In the manufacture of the electrode, in particular in the case of the process, in which a solvent is added to an electrode active material or an electrical conduction agent of organic compounds to form a slurry, and the slurry is then applied over the electrode current collector, and then the solvent is volatilized via a heating or at an ambient temperature to manufacture the electrodes, cracking or flaked off of the electrode is easily occurred. When an electrodes having a thickness of preferably equal to or larger than 40 μm and equal to or smaller than 300 μm is manufactured by employing a polyradical compound having fraction structure represented by general formula (2) of the present invention, it is characterized in that uniform electrode can be manufactured with less creation of cracking or flaked off of the electrode.

When a battery cell is manufactured, there are two manners for manufacturing the battery cell: by employing a polyradical compound itself, which has a fraction structure represented by general formula (1) in its molecule and is cross-linked by a bifunctionalized crosslinking agent having two polymerizing groups in its molecule represented by general formula (2), for the electrode active material; and by employing a polymer, which is capable of being changed via an electrode reaction to a polyradical compound, which has a fraction structure represented by general formula (1) in its molecule and is cross-linked by a bifunctionalized crosslinking agent having two polymerizing groups in its molecule represented by general formula (2). Examples of the polymer, which is capable of being changed via such electrode reaction to the polyradical compound, which has a fraction structure represented by general formula (1) in its molecule and is cross-linked by a bifunctionalized crosslinking agent having two polymerizing groups in its molecule represented by general formula (2), typically include a lithium salt or a sodium salt, which is composed of anionic body, which is obtained by a reduction reaction of a polyradical compound, which has a fraction structure represented by general formula (1) in its molecule and is cross-linked by a bifunctionalized crosslinking agent having two polymerizing groups in its molecule represented by general formula (2), and electrolytic cation such as lithium ion, sodium ion and the like; and a salt, which is composed of cationic body, which is obtained by an oxidation of a polyradical compound, which has a fraction structure represented by general formula (1) in its molecule and is cross-linked by a bifunctionalized crosslinking agent having two polymerizing groups in its molecule represented by general formula (2), and electrolytic anion such as $PF_6^-$, $BF_4^-$ and the like.

In the present invention, conventionally known conditions in the operations for manufacturing the battery cells may be employed for other conditions of manufacturing operations such as pulling a lead out from an electrode, type of the sheath and the like.

While the preferred embodiments of the present invention has been fully described above in reference to the annexed figures, it is intended to present these embodiments for the purpose of illustrations of the present invention only, and various modifications other than that described above are also available.

EXAMPLES

While the details of the present invention will be specifically described below in reference to synthesizing examples and examples, it is intended that the present invention is not limited to these examples.

Synthesizing Example 1

Crosslinking molecule (A) having fraction structure represented by the above-described formula (12) was synthesized according to the following synthesis scheme (33).

CROSSLINKING MOLECULE (A)

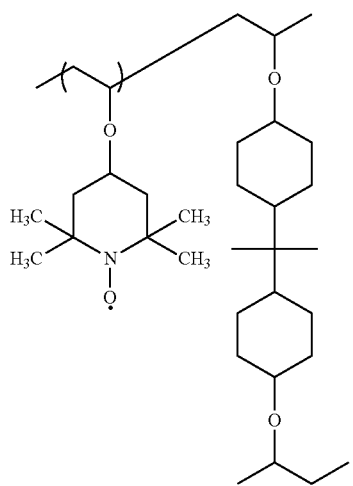

[1] Synthesis of Crosslinking Molecule (A)

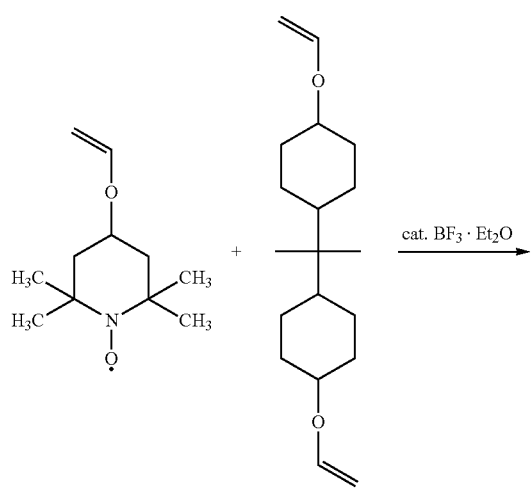

(33)

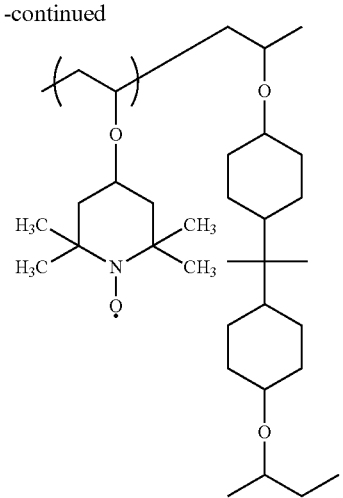

Under an argon atmosphere, 100 ml of dichloro methane, 10.0 g (50.4 mmol) of 2,2,6,6-tetramethylpiperidine-4-vinyloxy-1-oxyl(monomer) and 57 mg (crosslinking agent: 1%) (0.50 mmol) of ethylene glycol divinyl ether were charged into 200 ml three-neck round flask, and then were cooled to −78 degree C. Further, 280 mg (2 mmol) of boron trifluoride-diethylether complex was added to the flask and homogenized, and then the reaction was allowed to proceed at −25 degree C. for 20 hours. After the reaction was completed, the reaction mixture was warmed to the room temperature, and filtered to get solid material, and then the obtained solid material was washed with methanol for several times and dried under vacuum to obtain red solid crosslinking molecule (A) (at yield of 70%). Chemical structure of the obtained crosslinking molecule (A) was identified with infra red (IR) spectrum, and the results showed that peaks at 966 and 674 (cm$^{-1}$) derived from vinyl group observed in monomer were disappeared. The obtained crosslinking molecule (A) was not dissolved in the organic solvent at all. Spin density of crosslinking molecule (A) obtained via electron spin resonance (ESR) spectrum was $3.02\times10^{21}$ spins/g. This is substantially equivalent to a spin concentration in the case, in which it is assumed that no radical in the polymer is inactivated by the polymerization and such radical exists in the form of radical.

Synthesizing Example 2

Crosslinking molecule (B) having fraction structure represented by the above-described formula (13) was synthesized according to the following synthesis scheme (34).

CROSSLINKING MOLECULE (B)

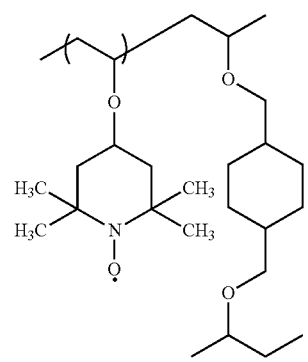

[2] Synthesis of Crosslinking Molecule (B)

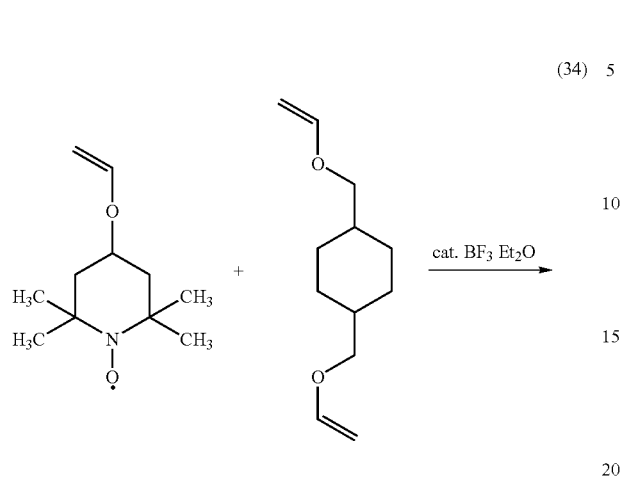

(34)

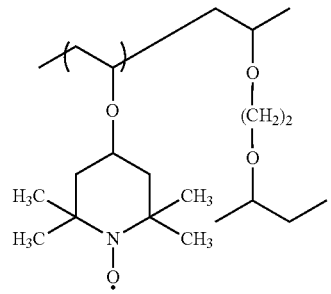

CROSSLINKING MOLECULE (C)

[3] Synthesis of Crosslinking Molecule (C)

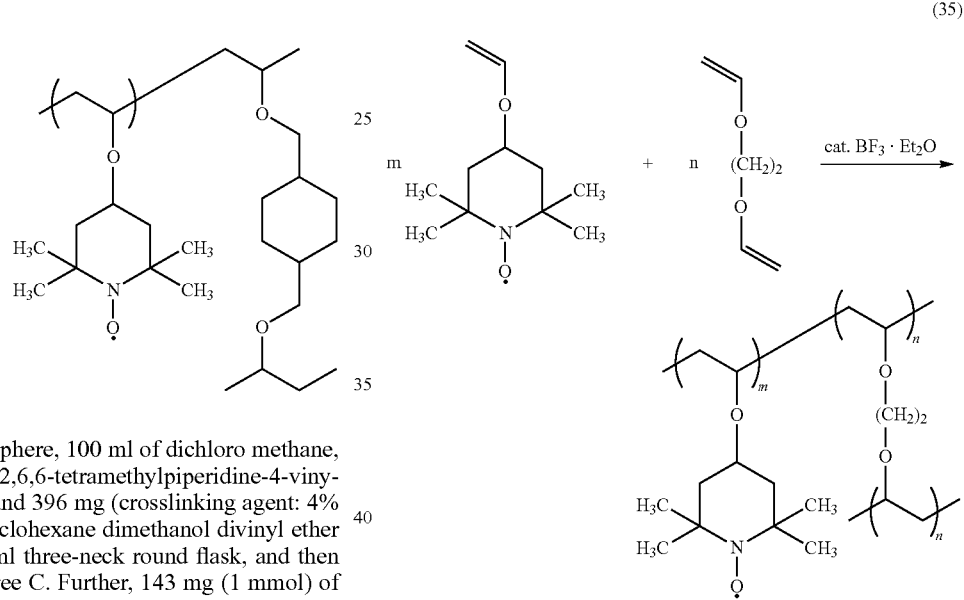

(35)

Under an argon atmosphere, 100 ml of dichloro methane, 10.0 g (50.4 mmol) of 2,2,6,6-tetramethylpiperidine-4-vinyloxy-1-oxyl(monomer) and 396 mg (crosslinking agent: 4% mol.) (0.50 mmol) of cyclohexane dimethanol divinyl ether were charged into 200 ml three-neck round flask, and then were cooled to −78 degree C. Further, 143 mg (1 mmol) of boron trifluoride-diethylether complex was added to the flask and homogenized, and then the reaction was allowed to proceed at −25 degree C. for 20 hours.

After the reaction was completed, the reaction mixture was warmed to the room temperature, and filtered to get solid material, and then the obtained solid material was washed with methanol for several times and dried under vacuum to obtain red solid crosslinking molecule (B) (at yield of 70%). Chemical structure of the obtained crosslinking molecule (B) was identified with IR spectrum, and the results showed that peaks at 966 and 674 (cm$^{-1}$) derived from vinyl group observed in monomer were disappeared. The obtained crosslinking molecule (B) was not dissolved in the organic solvent at all. Spin density of crosslinking molecule (B) obtained via ESR spectrum was $2.63 \times 10^{21}$ spins/g. This is substantially equivalent to a spin concentration in the case, in which it is assumed that no radical in the polymer is inactivated by the polymerization and such radical exists in the form of radical.

Synthesizing Example 3

Crosslinking molecule (C) having fraction structure represented by the above-described formula (14) was synthesized according to the following synthesis scheme (35).

Under an argon atmosphere, 100 ml of dichloro methane, 10.0 g (50.4 mmol) of 2,2,6,6-tetramethylpiperidine-4-vinyloxy-1-oxyl(monomer) and 115 mg (crosslinking agent: 4% mol.) (0.50 mmol) of ethylene glycol divinyl ether were charged into 200 ml three-neck round flask, and then were cooled to −78 degree C.

Further, 143 mg (1 mmol) of boron trifluoride-diethylether complex was added to the flask and homogenized, and then the reaction was allowed to proceed at −25 degree C. for 20 hours. After the reaction was completed, the reaction mixture was warmed to the room temperature, and filtered to get solid material, and then the obtained solid material was washed with methanol for several times and dried under vacuum to obtain red solid crosslinking molecule (C) (at yield of 70%). Chemical structure of the obtained crosslinking molecule (C) was identified with IR spectrum, and the results showed that peaks at 966 and 674 (cm$^{-1}$) derived from vinyl group observed in monomer were disappeared. The obtained crosslinking molecule (C) was not dissolved in the organic solvent at all.

Spin density of crosslinking molecule (C) obtained via ESR spectrum was $2.70 \times 10^{21}$ spins/g. This is substantially equivalent to a spin concentration in the case, in which it is assumed that no radical in the polymer is inactivated by the polymerization and such radical exists in the form of radical.

Synthesizing Example 4

Crosslinking molecule (D) having fraction structure represented by the above-described formula (25) was synthesized according to the following synthesis scheme (36).

CROSSLINKING MOLECULE (D)

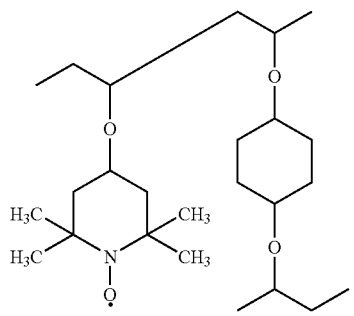

[4] Synthesis of Crosslinking Molecule (D)

(36)

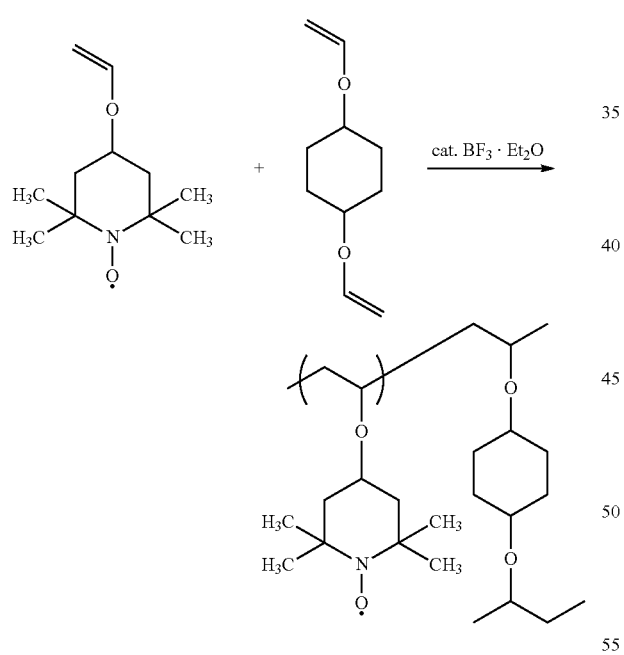

Under an argon atmosphere, 100 ml of dichloro methane, 10.0 g (50.4 mmol) of 2,2,6,6-tetramethylpiperidine-4-vinyloxy-1-oxyl(monomer) and 170 mg (crosslinking agent: 4% mol.) (0.50 mmol) of cyclohexane diol divinyl ether were charged into 200 ml three-neck round flask, and then were cooled to −78 degree C.

Further, 143 mg (1 mmol) of boron trifluoride-diethylether complex was added to the flask and homogenized, and then the reaction was allowed to proceed −25 degree C. for 20 hours. After the reaction was completed, the reaction mixture was warmed to the room temperature, and filtered to get solid material, and then the obtained solid matter was washed with methanol for several times and dried under vacuum to obtain red solid crosslinking molecule (D) (at yield of 72%). Chemical structure of the obtained crosslinking molecule (D) was identified with IR spectrum, and the results showed that peaks at 966 and 674 ($cm^{-1}$) derived from vinyl group observed in monomer were disappeared. The obtained crosslinking molecule (D) was not dissolved in the organic solvent at all.

Spin density of crosslinking molecule (D) obtained via ESR spectrum was $2.69 \times 10^{21}$ spins/g. This is substantially equivalent to a spin concentration in the case, in which it is assumed that no radical in the polymer is inactivated by the polymerization and such radical exists in the form of radical.

Synthesizing Example 5

Crosslinking molecule (E) having fraction structure represented by the above-described formula (26) was synthesized according to the following synthesis scheme (37).

CROSSLINKING MOLECULE (E)

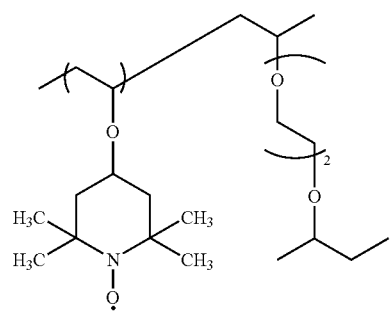

[5] Synthesis of Crosslinking Molecule (E)

(37)

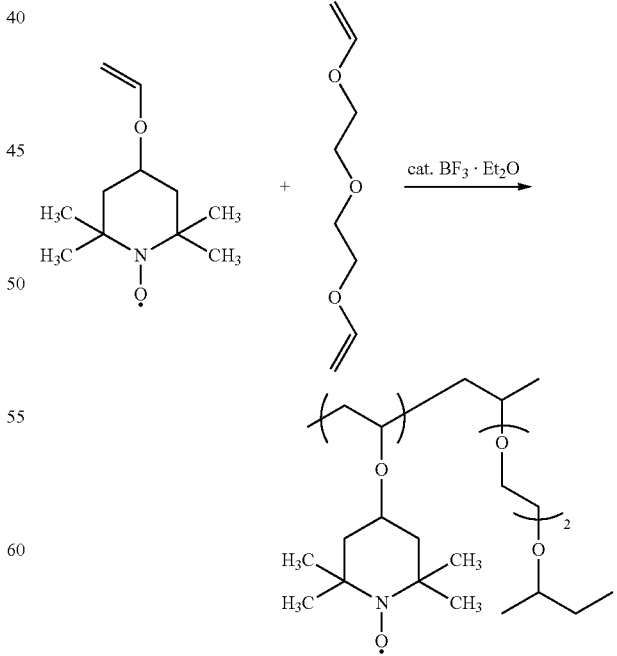

Under an argon atmosphere, 100 ml of dichloro methane, 10.0 g (50.4 mmol) of 2,2,6,6-tetramethylpiperidine-4-vinyloxy-1-oxyl(monomer) and 159 mg (crosslinking agent: 4% mol.) (0.50 mmol) of diethylene glycol divinyl ether were charged into 200 ml three-neck round flask, and then were cooled to −78 degree C.

Further, 143 mg (1 mmol) of boron trifluoride-diethylether complex was added to the flask and homogenized, and then the reaction was allowed to proceed at −25 degree C. for 20 hours. After the reaction was completed, the reaction mixture was warmed to the room temperature, and filtered to get solid material, and then the obtained solid material was washed with methanol for several times and dried under vacuum to obtain red solid crosslinking molecule (E) (at yield of 75%). Chemical structure of the obtained crosslinking molecule (E) was identified via IR spectrum, and the results showed that peaks at 966 and 674 (cm$^{-1}$) derived from vinyl group observed in monomer were disappeared. The obtained crosslinking molecule (E) was not dissolved in the organic solvent at all. Spin density of crosslinking molecule (E) obtained via ESR spectrum was $2.68 \times 10^{21}$ spins/g. This is substantially equivalent to a spin concentration in the case, in which it is assumed that no radical in the polymer is inactivated by the polymerization and such radical exists in the form of radical.

Example 1

In an agate morter, 300 mg of crosslinking molecule (A) synthesized in Synthesizing Example 1, 600 mg of graphite powder and 100 mg of polytetrafluoroethylene resin binder were weighed and were kneaded. A mixture obtained by dry blending for approximately 10 minutes was roller-drawn with applying a pressure to obtain a thin film having a thickness of about 150 μm. This was further dried in vacuum at 100 degree C. for overnight, and then was punched out to circles having a diameter of 12 mm to form electrodes for coin battery cell. In addition to above, weight of such electrode was 17.4 mg.

Next, the obtained electrode was immersed into an electrolytic solution to transfuse the gaps in the electrode with the electrolytic solution. The electrolytic solution employed here was ethylene carbonate/diethyl carbonate mixture solution (volumetric mixing ratio 3:7) containing 1.0 mol/l of LiPF$_6$ electrolytic salt. The electrode impregnated with the electrolytic solution was disposed on the cathode current collector, and a polypropylene porous film separator similarly impregnated with the electrolytic solution was further deposited thereon. Further, a lithium-sticked copper foil serving as a negative electrode was deposited thereon, and in the condition where an insulating packing was circumferentially disposed, respective stainless steel sheaths (commercially available from Hohsen) were put from the side of the positive electrode and the side of the negative electrode. Then the composite was pressurized by employing a calking machine to form a sealed coin cell employing cross-linked polyradical compound for the positive-electrode active material and metallic lithium for the anode active material.

The coin cell thus manufactured was charged with a constant current of 0.1 mA/cm$^2$ until the voltage was increased to 4.0 V, and then was discharged through constant current of 0.1 mA/cm$^2$ until the voltage was decreased to 3.0 V. The result showed that the voltage thereof was almost constant for 6 hours and 10 minutes at about 3.5 V, and then was rapidly decreased. The discharge capacitance per electrode active material was 117 mAh/g. Similarly, charging and discharging cycles were repeated over 100 cycles within a range of from 4.0 to 3.0 V. The result showed that, in every cycle of the 100 cycles of charging and discharging, the voltage became constant during the discharging at around 3.5 V, and a value obtained by [(discharge capacitance at 100th cycle)/(discharge capacitance at first cycle)]×100(%) was 95%.

Example 2

To a small homogenizer container, 20 g of N-methylpyrrolidone was weighed, and 400 mg of polyvinylidene fluoride was added, and then was stirred for 30 minutes to be completely dissolved. To the resulting mixture, 1.0 g of crosslinking molecule (A) synthesized in Synthesizing Example 1 was added, and the mixture was stirred for 5 minutes until the entire solution was uniformly colored orange. 600 mg of graphite powder was added thereto, and was further stirred for 15 minutes to obtain a slurry. The obtained slurry was applied over an aluminum foil, and was dried at 120 degree C. to manufacture a positive electrode. The thickness of the positive electrode layer was 130 μm. No flaking or crack was observed in the manufactured electrode, and the surface was uniform. This was punched out to disks having a diameter of 12 mm to form electrodes for coin cells. In addition to above, weight of such electrode was 12.6 mg.

Next, the obtained electrode was immersed into an electrolytic solution to transfuse the gaps in electrode with the electrolytic solution. The electrolytic solution employed here was ethylene carbonate/diethyl carbonate mixture solution (volumetric mixing ratio 3:7) containing 1.0 mol/l of LiPF$_6$ electrolytic salt. The electrode impregnated with the electrolytic solution was disposed on the cathode current collector (aluminum foil), and a polypropylene porous film separator similarly impregnated with the electrolytic solution was further deposited thereon. Further, a lithium-sticked copper foil provided with a graphite layer on one side thereof serving as a negative electrode was deposited thereon, and in the condition where an insulating packing was circumferentially disposed, respective stainless steel sheaths (commercially available from Hohsen) were put from the side of the positive electrode and the side of the negative electrode.

Then the composite was pressurized by employing a calking machine to form a sealed coin cell employing crosslinking molecule (A) for the positive-electrode active material and graphite for the anode active material.

The coin cell thus manufactured was charged with a constant current of 0.1 mA until the voltage was increased to 4.0 V, and then was discharged through constant current of 0.1 mA until the voltage was decreased to 3.0 V. The result showed that the voltage thereof was almost constant for 7 hours and 30 minutes at about 3.5 V, and then was rapidly decreased.

The discharge capacitance per electrode active material was 120 mAh/g. Similarly, charging and discharging cycles were repeated over 100 cycles within a range of from 4.0 to 3.0 V. The result showed that, in every cycle of the 100 cycles of charging and discharging, the voltage became constant during the discharging at around 3.5 V, and a value obtained by [(discharge capacitance at 100th cycle)/(discharge capacitance at first cycle)]×100(%) was 96%.

Example 3

To a small homogenizer container, 10 g of water was weighed, and 25 mg of carboxymethyl cellulose was added, and then the mixture was stirred for 30 minutes to be completely dissolved. 100 mg of poly(tetrafluoroethylene) (PTFE) was added therein, and was further stirred, and then 1.125 g of powder of vapor grown carbon fiber (VGCF) was added and was stirred again. Further, 1.25 g of crosslinking molecule (A) synthesized in Synthesizing Example 1 was added therein, and then was further stirred for one hour to obtain a slurry. The obtained slurry was applied over an aluminum foil, and was dried at 100 degree C. to manufacture a positive electrode. The thickness of the positive electrode layer was 100 μm.

No flaking or crack was observed in the manufactured electrode, and the surface was uniform. This was punched out to disks having a diameter of 12 mm to form electrodes for coin cells.

In addition to above, weight of such electrode was 5.2 mg.

Next, the obtained electrode was immersed into an electrolytic solution to transfuse the gaps in electrode with the electrolytic solution.

The electrolytic solution employed here was ethylene carbonate/diethyl carbonate mixture solution (volumetric mixing ratio 3:7) containing 1.0 mol/l of $LiPF_6$ electrolytic salt. The electrode impregnated with the electrolytic solution was disposed on the cathode current collector, and a polypropylene porous film separator similarly impregnated with the electrolytic solution was further deposited thereon. Further, a lithium-sticked copper foil serving as a negative electrode was deposited thereon, and in the condition where an insulating packing was circumferentially disposed, respective stainless steel sheathes (commercially available from Hohsen) were put from the side of the positive electrode and the side of the negative electrode. Then the composite was pressurized by employing a calking machine to form a sealed coin cell employing cross-linked polyradical compound for the positive-electrode active material and metallic lithium for the anode active material.

Such coin cell was charged with a constant current of 0.1 mA until the voltage was increased to 4.0 V, and then was discharged through constant current of 0.1 mA until the voltage was decreased to 3.0 V. The result showed that a flat partial profile of the voltage was observed for about 3 hours at about 3.5 V. The discharge capacitance per electrode active material was 118 mAh/g. Charging and discharging cycles were repeated over 100 cycles within a range of from 4.0 to 3.0 V, resulting in that a value obtained by [(discharge capacitance at 100th cycle)/(discharge capacitance at first cycle)]×100(%) was 95%.

Example 4

A coin cell was manufactured by a process similar as employed in Examples 3, except that crosslinking molecule (B) synthesized in Synthesizing Example 2 was employed in substitution for crosslinking molecule (A). No flaking or crack was observed in the manufactured electrode, and the surface was uniform. The weight of the positive electrode of such coin cell was 5.6 mg.

Such coin cell was charged with a constant current of 0.1 mA until the voltage was increased to 4.0 V, and then was discharged through constant current of 0.1 mA until the voltage was decreased to 3.0 V. The result showed that a flat partial profile of the voltage was observed for 3 hours and 20 minutes at about 3.5 V.

The discharge capacitance per electrode active material was 120 mAh/g. Charging and discharging cycles were repeated over 100 cycles within a range of from 4.0 to 3.0 V, resulting in that a value obtained by [(discharge capacitance at 100th cycle)/(discharge capacitance at first cycle)]×100(%) was 93%.

Example 5

A coin cell was manufactured by a process similar as employed in Examples 3, except that crosslinking molecule (C) synthesized in Synthesizing Example 3 was employed in substitution for crosslinking molecule (A). No flaking or crack was observed in the manufactured electrode, and the surface was uniform. The weight of the positive electrode of such coin cell was 5.5 mg. Such coin cell was charged with a constant current of 0.1 mA until the voltage was increased to 4.0 V, and then was discharged through constant current of 0.1 mA until the voltage was decreased to 3.0 V. The result showed that a flat partial profile of the voltage was observed for about 3 hours at about 3.5 V. The discharge capacitance per electrode active material was 117 mAh/g. Charging and discharging cycles were repeated over 100 cycles within a range of from 4.0 to 3.0 V, resulting in that a value obtained by [(discharge capacitance at 100th cycle)/(discharge capacitance at first cycle)]×100(%) was 95%.

Comparative Example 1

Under an argon atmosphere, 10.0 g (50.4 mmol) of 2,2,6,6-tetramethylpiperidine-4-vinyloxy-1-oxyl(monomer) and 100 ml of dichloro methane were charged into in 200 ml three-neck round flask, and then were cooled to −78 degree C. Further, 143 mg (1 mmol) of boron trifluoride-diethylether complex was added to the flask and homogenized, and then the reaction was allowed to proceed at −78 degree C. for 20 hours. After the reaction was completed, the reaction mixture was warmed to the room temperature, and filtered to get solid material, and then the obtained solid material was washed with methanol for several times and dried under vacuum to obtain red solid non-crosslinking molecule (a) (at yield of 70%). Chemical structure of the obtained non-crosslinking molecule (a) was identified with IR spectrum, and the results showed that peaks at 966 and 674 ($cm^{-1}$) derived from vinyl group observed in monomer were disappeared. Spin density of non-crosslinking molecule (a) obtained via ESR spectrum was $2.75 \times 10^{21}$ spins/g. This is substantially equivalent to a spin concentration in the case, in which it is assumed that no radical in the polymer is inactivated by the polymerization and such radical exists in the form of radical.

A process similar as employed in Examples 3 was employed to manufacture a coin cell, except that non-crosslinking molecule (a) synthesized here was employed in substitution for crosslinking molecule (A). Charging and discharging were conducted for the manufactured battery cell within a range of from 3.0 to 4.0 V similarly as in Example 3, and the results showed that the voltage thereof was almost constant for 6 hours and 30 minutes at about 3.5 V, and then was rapidly decreased. The discharge capacitance per electrode active material was 110 mAh/g. Similarly, charging and discharging cycles were repeated over 100 cycles within a range of from 3.0 to 4.0 V, resulting in that a value obtained by [(discharge capacitance at 100th cycle)/(discharge capacitance at first cycle)]×100(%) was 42%.

Comparative Example 2

A process similar as employed in Examples 1 was employed to manufacture a coin cell, except that 2,2,6,6-tetramethyl piperidinoxyl (TEMPO) was employed in substitution for crosslinking molecule (A). The discharge capacitance per electrode active material was 35 mAh/g. After charging and discharging cycles were repeated for 12 cycles within a range of from 4.0 to 3.0 V, charging and discharging was no longer possible, resulting in being not available in working as the battery cell.

Comparative Example 3

A process similar as employed in Examples 2 was employed to manufacture a coin cell, except that linear polyradical compound poly(methacryloyloxy-2,2,6,6-tetramethylpiperidine-N-oxyl) (Mn=89,000, Mw/Mn=3.0) was employed in substitution for crosslinking molecule (A).

Charging and discharging was conducted similarly as in Examples 1, and the resulting discharge capacitance per electrode active material was calculated, and the calculated discharge capacitance per electrode active material was 78 mAh/g. Charging and discharging cycles were repeated over 100 cycles within a range of from 4.0 to 3.0 V, resulting in that a value obtained by [(discharge capacitance at 100th cycle)/(discharge capacitance at first cycle)]×100(%) was 52%.

The invention claimed is:

1. An electrode active material including a polyradical compound, comprising:
a repeated structural unit represented by the following general formula (1):

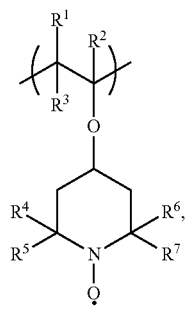

(1)

wherein $R^1$ to $R^3$ each independently represent hydrogen or methyl group and $R^4$ to $R^7$ each independently represent $C_1$ to $C_3$ alkyl group,
wherein said polyradical compound is formed by crosslinking said structural unit with a bifunctionalized crosslinking agent having two polymerizing groups represented by the following general formula (2):

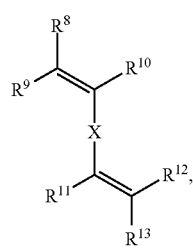

(2)

wherein $R^8$ to $R^{13}$ each independently represent hydrogen or methyl group, X represents a single bond, a linear, a branched or a cyclic $C_1$ to $C_{15}$ alkylenedioxy group, an alkylene group, a phenylenedioxy group, a phenylene group or a structure represented by general formula (3):

(3)

wherein k represents an integer of 2 to 5,
wherein, the polyradical compound is utilized in at least one of a positive electrode and a negative electrode of a battery cell, said battery cell comprises, at least, said positive electrode, said negative electrode and an electrolyte.

2. The electrode active material according to claim 1, wherein the polyradical compound further comprises:
a structure represented by the following general formula (4):

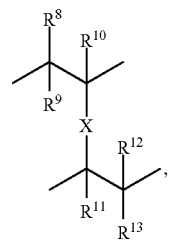

(4)

wherein $R^8$ to $R^{13}$ each independently represent hydrogen or methyl group and X represents a single bond, linear, branched or cyclic $C_1$ to $C_{15}$ alkylenedioxy group, an alkylene group, a phenylenedioxy group, a phenylene group or a structure represented by general formula (3):

(3)

wherein k represents an integer of 2 to 5.

3. The electrode active material according to claim 1, wherein the bifunctionalized crosslinking agent is the structure represented by the following general formula (3), or a plurality thereof:

(3)

wherein k represents an integer of 2 to 5.

4. The electrode active material according to claim 1, wherein the bifunctionalized crosslinking agent is at least one of compounds represented by the following general formulae (i) to (vii):

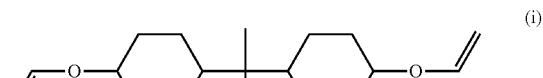

(i)

(ii)

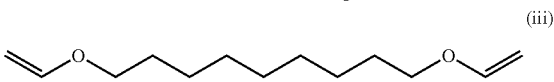

(iii)

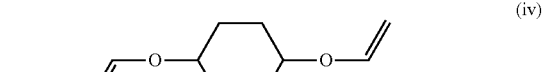

(iv)

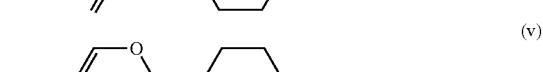

(v)

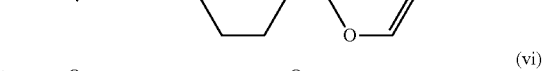

(vi)

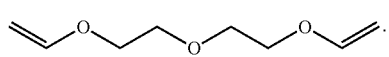
(vii)

5. The electrode active material according to claim 1, wherein the bifunctionalized crosslinking agent is a compound represented by the following general formula (viii):

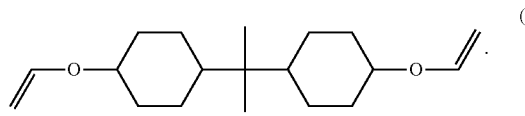
(viii)

6. The electrode active material according to claim 2, wherein molar ratio of the repeated structure represented by general formula (1) to structure represented by general formula (4) is within a range of 10:1 to 1000:1.

7. A battery cell including the electrode active material according to claim 1 for the electrode active material in at least one of the positive electrode and the negative electrode of the battery cell, said battery cell comprising components of, at least, said positive electrode, said negative electrode and the electrolyte.

8. The battery cell according to claim 7, wherein said electrode active material is a positive-electrode active material.

9. The battery cell according to claim 7, wherein said battery cell is a lithium battery cell.

10. The battery cell according to claim 9, wherein said battery cell is a lithium secondary cell.

11. A process for producing the electrode active material according to claim 1, comprising:
crosslinking a radical-substituted vinyl ether compound with a difunctionalized crosslinking agent having two polymerization groups in the presence of cationic polymerization catalyst to obtain polyradical compound;
wherein said radical-substituted vinyl ether compound is represented by the following general formula (11):

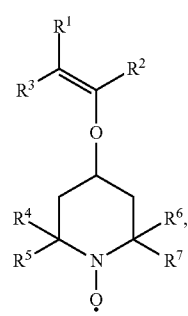
(11)

wherein $R^1$ to $R^3$ each independently represent hydrogen or methyl group and $R^4$ to $R^7$ each independently represent $C_1$ to $C_3$ alkyl group; and
wherein said difunctionalized crosslinking agent having two polymerization groups is represented by the following general formula (2):

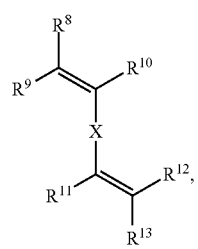
(2)

wherein R8 to R13 each independently represent hydrogen or methyl group and X represents single bond, linear, branched or cyclic C1 to C15 alkylenedioxy group, alkylene group, phenylenedioxy group, phenylene group or structure represented by general formula (3):

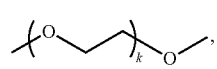
(3)

wherein k represents an integer of 2 to 5.

12. The process for producing the electrode material according to claim 11, wherein said cationic polymerization catalyst is Lewis acid.

13. The process for producing the electrode material according to claim 11, wherein the bifunctionalized crosslinking agent is at least one of compounds represented by the following general formulae (i) to (vii):

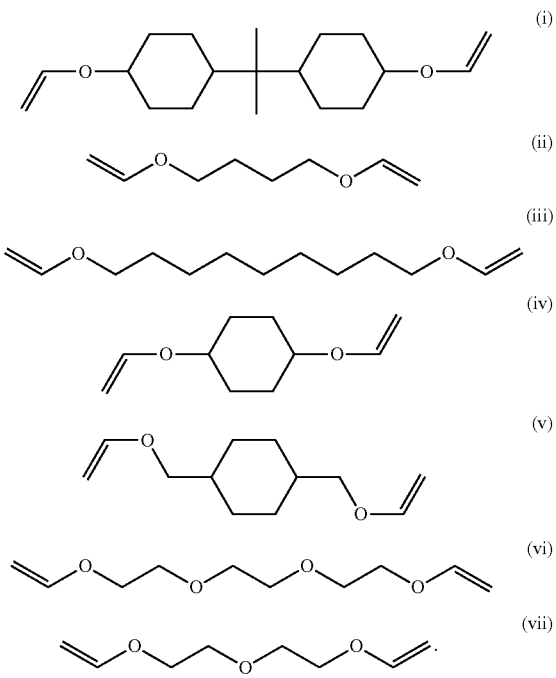

14. The process for producing the electrode material according to claim 11, wherein the bifunctionalized crosslinking agent is a compound represented by the following general formula (viii):

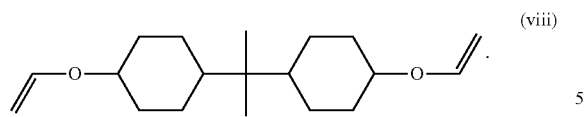
15. The battery cell according to claim 8, wherein said battery cell is a lithium battery cell.
* * * * *